United States Patent [19]

Suemura et al.

[11] Patent Number: 5,887,039
[45] Date of Patent: Mar. 23, 1999

[54] DATA TRANSMISSION SYSTEM USING SPECIFIC PATTERN FOR SYNCHRONIZATION

[75] Inventors: Yoshihiko Suemura; Naoya Henmi; Akio Tajima, all of Tokyo, Japan

[73] Assignee: NEC Corporation, Tokyo, Japan

[21] Appl. No.: 356,555

[22] Filed: Dec. 15, 1994

[30] Foreign Application Priority Data

Dec. 16, 1993 [JP] Japan .................................. 5-316199
Sep. 28, 1994 [JP] Japan .................................. 6-232919

[51] Int. Cl.$^6$ ...................................................... H04L 7/00
[52] U.S. Cl. ......................................... 375/365; 371/47.1
[58] Field of Search .................................. 375/368, 365, 375/354, 366, 367, 369, 370, 364; 371/47.1, 20.4, 5.4; 370/522

[56] References Cited

U.S. PATENT DOCUMENTS

| | | | |
|---|---|---|---|
| 4,748,623 | 5/1988 | Fujimoto | 375/368 |
| 5,140,618 | 8/1992 | Kinoshita et al. | 375/368 |
| 5,163,069 | 11/1992 | Hayashi | 375/368 X |
| 5,204,883 | 4/1993 | Blanc | 375/368 |
| 5,210,754 | 5/1993 | Takahashi et al. | 375/368 X |
| 5,212,690 | 5/1993 | Löw | 375/368 |
| 5,276,691 | 1/1994 | Kivari | 371/47.1 |

FOREIGN PATENT DOCUMENTS 4115734  4/1992  Japan .

OTHER PUBLICATIONS

Kaneko, "PCM Communication Techniques", pp. 109–116, Sanpoh, 1976.

*Primary Examiner*—Chi H. Pham
*Assistant Examiner*—Bryan Webster
*Attorney, Agent, or Firm*—Sughrue, Mion, Zinn, Macpeak & Seas, PLLC

[57] ABSTRACT

Parallel digital data are transmitted along with a specific synchronization pattern added thereto. Each synchronization pattern adder adds the synchronization pattern at an equal timing for each channel. Parallel data after the synchronization pattern addition, are converted in parallel-to-serial converters into serial data which are in turn converted in an optical transmitter into optical signal. On the receiving side, the optical signal is converted in an optical receiver into an electric signal, from which the parallel data are restored in serial-to-parallel converters to be inputted to synchronization pattern detectors. The synchronization pattern detectors compare their shift register data and synchronization pattern and hold their synchronization pattern detection signal to be "1" for one time slot if the number of non-accord bits is within one. In the next time slot, a controller recognizes synchronization pattern detection when and only when all the synchronization pattern detection signals are "1". In this way, reliable synchronization pattern detection can be made regardless of the occurrence of any transmission error in the synchronization pattern.

8 Claims, 12 Drawing Sheets

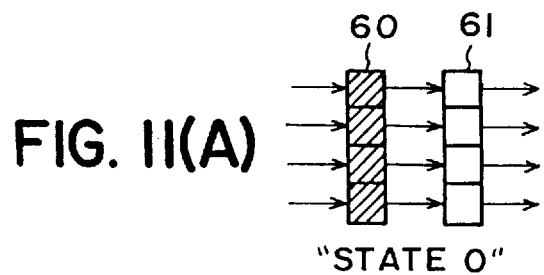
FIG. 11(A) "STATE 0"
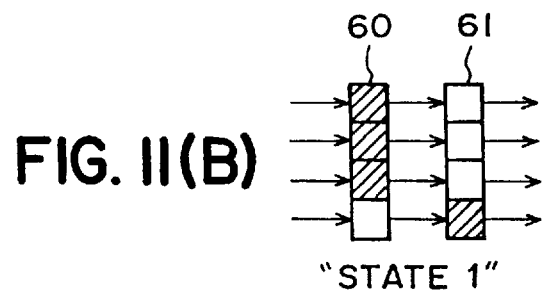
FIG. 11(B) "STATE 1"
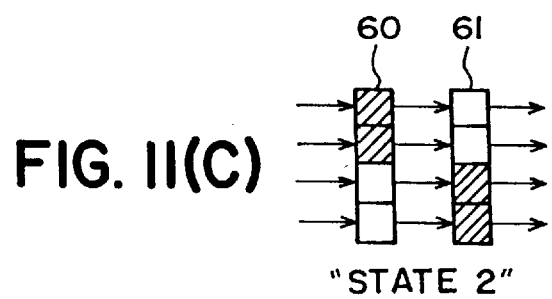
FIG. 11(C) "STATE 2"
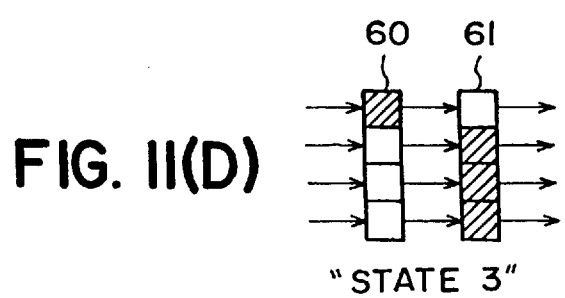
FIG. 11(D) "STATE 3"

FIG. 12(A)

SERIAL/PARALLEL (S/P) CONVERTER INPUT

SYNCHRONIZATION PATTERN

| Unit | | | | | | | | | | | | | | | | |
|---|---|---|---|---|---|---|---|---|---|---|---|---|---|---|---|---|
| UNIT 0 | d | 0 | 1 | 0 | 1 | a | b | c | d | a | b | c | d | - | - | - |
| UNIT 1 | c | d | 0 | 1 | 0 | 1 | a | b | c | d | a | b | c | d | - | - |
| UNIT 2 | b | c | d | 0 | 1 | 0 | 1 | a | b | c | d | a | b | c | d | - |
| UNIT 3 | a | b | c | d | 0 | 1 | 0 | 1 | a | b | c | d | a | b | c | d |

FIG. 12(B)

S/P CONVERTER OUTPUT (1st input register)

| UNIT | | | | | |
|---|---|---|---|---|---|
| UNIT 0 | A | d | d | 1 | d |
|  | B | a | 0 | a | a |
|  | C | b | 1 | b | b |
|  | D | c | 0 | c | c |
| UNIT 1 | A | c | c | 0 | c |
|  | B | d | d | 1 | d |
|  | C | a | 0 | a | a |
|  | D | b | 1 | b | b |
| UNIT 2 | A | b | b | 1 | b |
|  | B | c | c | 0 | c |
|  | C | d | d | 1 | d |
|  | D | a | 0 | a | a |
| UNIT 3 | A | a | a | 0 | a |
|  | B | b | b | 1 | b |
|  | C | c | c | 0 | c |
|  | D | d | d | 1 | d |

FIG. 12(C)

COLLATOR OUTPUT

UNIT 0: STATE 0, STATE 1, STATE 2, STATE 3 (pulse on STATE 3)
UNIT 1: STATE 0, STATE 1, STATE 2 (pulse), STATE 3
UNIT 2: STATE 0, STATE 1 (pulse), STATE 2, STATE 3
UNIT 3: STATE 0 (pulse), STATE 1, STATE 2, STATE 3

FIG. 12(D)

Sa (pulse)

FIG. 12(E)

OUTPUT REGISTER

| UNIT | | | | | |
|---|---|---|---|---|---|
| UNIT 0 | A | a | a | a | 0 |
|  | B | b | b | b | 1 |
|  | C | c | c | c | 0 |
|  | D | d | d | d | 1 |
| UNIT 1 | A | a | a | a | 0 |
|  | B | b | b | b | 1 |
|  | C | c | c | c | 0 |
|  | D | d | d | d | 1 |
| UNIT 2 | A | a | a | a | 0 |
|  | B | b | b | b | 1 |
|  | C | c | c | c | 0 |
|  | D | d | d | d | 1 |
| UNIT 3 | A | a | a | a | 0 |
|  | B | b | b | b | 1 |
|  | C | c | c | c | 0 |
|  | D | d | d | d | 1 |

DATA TRANSMISSION SYSTEM USING SPECIFIC PATTERN FOR SYNCHRONIZATION

BACKGROUND OF THE INVENTION

Field of the Invention

This invention relates to data transmission systems used between computers or like terminals, for inter-board connection, or for data interfaces in data transmission systems, switching systems, etc.

In many data links in which digital data packets are transmitted between computers or boards, a specific synchronization pattern called a "delimiter" is added to the leading end or to both the leading and trailing ends of each packet to realize packet synchronization. Particularly, where the packets are variable in length, reliable detection of the delimiter is necessary for the recognition of the leading and trailing packet ends.

As an application of an optical fiber communication to the data link of a such system, there are fiber channels as disclosed in, for instance, Fiber Channel Physical Layer (FC-PH) Rev. 2.1, ANSI X3T9.3/91-071, May 25, 1991). For parallel digital data transmission, the parallel data is often converted through time division multiplexing into a serial signal for transmission of the data on a reduced number of data lines. In such data transmission systems, it is necessary for the receiving side to realize frame synchronization for the serial-to-parallel conversion in order to ensure that the parallel data channels inputted on the transmitting side and those outputted on the receiving side are in accord with one another. To realize frame synchronization, a specific synchronization pattern is applied, which enables the receiving side to detect the frame phase.

In such a data link, a first problem is encountered when a transmission error occurs in the synchronization pattern itself which is added to data to be transmitted. In this case, it is unable to recognize the packet or frame phase, thus making all the data contained in the packet or frame ineffective. The problem arises frequently, because in an optical data link such as fiber channels, the transmission line is basically not error-free. In the case where the length of the packet or frame is fixed, it is possible to avoid the problem considerably by adopting the so-called "forward protection", i.e., causing a synchronization pattern detector operation like that of a flywheel (for instance, Kaneko, "PCM Communication Techniques", pp. 109–116, Sanpoh, 1976). Where the length of the packet or frame is variable, however, such a method cannot be adopted. On the contrary, there are cases where the same pattern as the synchronization pattern is present and can be erroneously judged to be the synchronization pattern. To avoid this, in the usual data link data is encoded such that the same pattern as the synchronization pattern will not be present in the resultant data. For example, in the case of the fiber channels mentioned above, transmission line codes called 8B10B codes are used, and only predetermined data characters are used for the data section. Since the delimiter has a pattern which is not contained in any data character, usually there is no possibility of mistaking data as the delimiter. Even in such a case, however, the occurrence of a transmission error in the data gives rise to the possibility of the appearance of the same pattern as the delimiter.

A second problem that arises in parallel data link is that of transmission time differences or skews among the individual channels. In a well-known method of absorbing skews, a FIFO (first-in first-out) buffer is provided on the receiving side of each channel, and data is read out from each FIFO under control of an equal phase clock. This method poses a problem that the hardware is increased.

Further, in the case of transmitting parallel data after parallel-to-serial conversion, there is a requirement for frame synchronization on the receiving side. For the restoration to the original parallel data it is necessary to discriminate each channel after the serial-to-parallel conversion and make a feedback control to the frame phase at the serial-to-parallel converter or effect channel interchange. In the former method, the control requires a certain period of time. During this time, no data can be transmitted. For instantaneously establishing the frame synchronization, therefore, the latter method has to be used. As methods of channel discrimination, there is one in which a unique synchronization pattern is used for each channel (a similar method being disclosed in Japanese Patent application Kokai Publication No. Hei 04-115734), and one in which channel identifiers are added to data. In the former method, a common structure cannot be adopted for a pattern detection circuit for each channel, thus leading to high cost. The latter method, on the other hand, has a problem of transmission efficiency reduction.

SUMMARY OF THE INVENTION

An object of the invention, therefore, is to overcome the problems existing in the prior art and to provide a data transmission method whereby a synchronization pattern can be reliably detected even when any transmission error arises in the synchronization pattern, thus eliminating ineffective packets.

According to the first aspect of the invention, there is provided a method for transmitting parallel digital data composed of time series digital data in one or more channels, the method comprising the steps of:

generating a synchronization pattern group at a transmitting side, by adding the synchronization pattern to digital data in each of a plurality of channels at proper timings;

generating a received pattern group at a receiving side, by extracting in each of the channels a received pattern equal in length to the synchronization pattern at proper timings; and determining if the number of non-matching bits as a result of comparison between the comparison the received pattern and the synchronization pattern is less than a predetermined threshold value, wherein the received pattern of the received pattern group in each channel substantially coincides with the synchronization pattern of each synchronization pattern group.

According to the second aspect of the invention, there is provided a method for transmitting parallel digital data composed of time series digital data in a plurality of channels, the method comprising the steps of:

generating a synchronization pattern group at a transmitting side, by adding the synchronization pattern to digital data in each of a plurality of channels at proper timings;

transmitting the synchronization pattern group as a serial data after parallel-to-serial conversion;

converting, at a receiving side, the serial data to parallel data by serial-to-parallel conversion;

generating a received pattern group by extracting in each of the channels a received pattern equal in length to the synchronization pattern at proper timings;

determining, if the number of non-matching bits as a result of comparison between the received pattern and the synchronization pattern is less than a predetermined threshold value, wherein the received pattern of the received pattern group in each channel substantially coincides with the synchronization pattern of each synchronization pattern group.

According to the third aspect of the invention, in the method as above, in the comparison between the received pattern and the synchronization pattern group, the received pattern is compared with synchronization pattern groups corresponding to all channel dispositions at individual timings of the serial-to-parallel conversion, and the result of comparison of the synchronization pattern group is used for discriminating channel dispositions.

According to the fourth aspect of the invention, there is provided a method for transmitting parallel digital data composed of time series digital data in a plurality of channels, the method comprising the steps of:

generating a synchronization pattern group at the transmitting side, through addition of predetermined synchronization patterns to the parallel digital data in all the channels at proper timings;

generating a received pattern group, at a receiving side, by extracting in each of the channels a received pattern equal in length to the synchronization pattern at proper timings;

determining, if the number of non-matching bits as a result of comparison between the received pattern and the synchronization pattern is less than a predetermined threshold value, wherein each received pattern of the received pattern group substantially coincides with synchronization pattern constituting each synchronization pattern group; and detecting transmission skews occurred among individual channels through comparison of detection timings of the synchronization pattern in each channel.

According to the fifth aspect of the invention, there is provided a method for transmitting parallel digital data composed of time series digital data in a plurality of channels, the method comprising the steps of:

dividing all the channels of the parallel digital data, at the transmitting side, into a plurality of channel units;

generating a plurality of serial digital data for each channel unit by parallel-to-serial conversion of the parallel digital data;

generating a synchronization pattern group through addition of predetermined synchronization patterns to all the serial digital data at proper timings;

generating a received pattern group, at a receiving side, by extracting in each of the serial digital data a received pattern equal in length to the synchronization pattern at proper timings;

determining if the number of non-matching bits as a result of comparison between the received pattern and the synchronization pattern is less than a predetermined threshold wherein the received pattern of the received pattern group substantially coincides with synchronization pattern constituting each synchronization pattern group;

detecting transmission skews among the serial digital data through comparison of detection timings of the synchronization pattern in each serial digital data; and restoring the original parallel digital data through compensation of the transmission skews and serial-to-parallel conversion of individual serial digital data.

According to the first aspect of the invention, a synchronization pattern group is generated on the transmitting side through addition of the synchronization pattern to digital data in a plurality of channels at proper timings. At this time, on receiving side, the advantage is taken of the fact that each channel's synchronization pattern constituting the synchronization pattern groups is detected at a known timing. For example, where the synchronization patterns are added on the transmitting side simultaneously for all the channels, each channel synchronization pattern on the receiving side is detected simultaneously if no skew is present. Accordingly, on the receiving side, the received pattern group is generated through extraction of each channel's received pattern at the known timing (i.e., simultaneously in the previous example), and if the number of non-accord bits in the comparison of the received pattern with the synchronization pattern is less than a certain threshold value, the channel's received patterns of the received pattern groups are judged as being synchronization patterns. With this arrangement, the following effects can be obtained. The case where some transmission errors in synchronization patterns in some channels have occurred is considered. Although a match with the synchronization pattern may not be obtained for these channels, it is obtained in the other majority channels. As a whole, the synchronization pattern detection thus can be obtained without error. Now the case where the same pattern as a synchronization pattern in a certain channel has appeared is considered. In this case, the pertinent part of data is in accord with the synchronization pattern in that channel, but this is not the case in the other channels. As a consequence, that part of data is not regarded as a synchronization pattern. It is to be appreciated that, according to the invention, an error detection function is provided in the synchronization pattern by the provision of redundancy through synchronization pattern addition for each channel.

According to the second aspect of the invention, after the addition of the synchronization pattern group, the digital data in each of a plurality of channels undergo parallel-to-serial conversion for transmission. Doing so not only permits data line number reduction but also eliminates skew along channels in the transmission line. This is significantly advantageous in carrying out the first aspect of the invention. For example, as the most common application of the first aspect of the invention, a system is conceivable in which synchronization pattern addition is made simultaneously for each channel on the transmitting side while received pattern collation is made simultaneously for each channel on the receiving side. In this system, it is a prerequisite that no skew arises among channels. By applying the second aspect of the invention, it is possible to realize skew-free transmission without use of any FIFO buffer or the like, thus permitting size reduction of the system and simplification of the control. The system according to the second aspect of the invention is thus most suited for realizing the system of the first aspect of the invention.

The third aspect of the invention provides a means for discriminating channels when the received serial digital data undergo serial-to-parallel conversion according to the second aspect of the invention. Lack of frame synchronization at the time of the serial-to-parallel conversion possibly results in channel interchange. Here, the number of channel dispositions is equal to the number of multi-plexed data. For example, in 1:8 serial-to-parallel conversion, there are eight different channel dispositions. In the individual channel data, time deviations arise according to the channel dispositions. This means that there are as many states of synchronization pattern groups as the number of different channel dispositions. Thus, according to the third aspect of the invention, when the received pattern is collated with the synchronization pattern after the serial-to-parallel conversion, all the states of synchronization pattern groups are collated. Thus, the disposition of channels can be recognized from which of the states is in accord. This method has a prerequisite that all the channel synchronization patterns must be reliably detected. Thus, it has advantages that its combination with the second aspect of the invention is very effective and that doing so does not lead to cost increases or transmission efficiency deterioration.

According to the fourth aspect of the invention, like the first to third aspects of the invention, on the transmitting side, a synchronization pattern group can be generated through addition of synchronization patterns to all channel data at proper timings and, on the receiving side, the synchronization pattern group is detected in order to increase the accuracy of the synchronization pattern detection in each channel. Further, it is possible to obtain skew detection through comparison of synchronization pattern detection timing in each channel, thus permitting skew compensation. For example, a case will now be considered, in which a synchronization pattern is added for each channel simultaneously on the transmitting side. On the receiving side, the comparison of the received pattern and synchronization pattern is made at an equal timing for each channel. Further, among the channels, a decision is made as to whether the result of collation is "accord" or "non-accord". When the collation result is "accord" in the majority of channels, it is decided that synchronization pattern group detection has been made. At this time, no skew develops among the "accord" channels. With the "non-accord" channels, synchronization pattern retrieval is made over a range of several preceding and succeeding time slots. If the range of retrieval is sufficiently wide, synchronization pattern detection is obtained without exception. (In this case, the occurrence of no transmission error is assumed. A case of the transmission error occurrence can be coped with by allowing a certain degree of "non-accord" in the synchronization pattern collation.) Thus, skew detection is possible through comparison of the detection timing with the synchronization pattern group detection timing. Skew compensation thus can be realized through absorption of the detected skew with the FIFO buffer or the like. According to the invention, through synchronization pattern group detection, it is possible to increase the accuracy of synchronization pattern detection in each channel, thus significantly increasing the skew compensation accuracy.

According to the fifth aspect of the invention, the fourth aspect of the invention is applied to a parallel data link, in which the number of physical transmission channels is reduced by grouping parallel digital data into a plurality of units for each of a plurality of channels and permitting, for each unit, parallel-to-serial conversion on the transmitting side and serial-to-parallel conversion on the receiving side. Through comparison of the timing of detection of the synchronization pattern which can be reliably detected, it is possible to obtain, in addition to the skew compensation, a new function of providing for reliable frame synchronization in the serial-to-parallel conversion. According to the invention, the synchronization pattern group is generated through addition of a synchronization pattern to each of a plurality of serial digital data after the parallel-to-serial conversion of each unit. On the receiving side, like the fourth aspect of the invention, the detection of synchronization pattern groups and the detection of skews among the serial digital data are made, and also serial-to-parallel conversion is made while making skew compensation. For example, frame synchronization is taken through serial-to-parallel conversion at an equal timing for all the groups after skew compensation with the FIFO buffer. Or, alternatively, both the skew compensation and the frame synchronization are realized simultaneously by permitting serial-to-parallel conversion first and then permitting channel interchange (i.e., bit rotation) by referring to detected skew information.

BRIEF DESCRIPTION OF THE DRAWINGS

The above and other objects, features and advantages of the present invention will be apparent from the following description of preferred embodiments of the invention explained with reference to the accompanying drawings, in which:

FIG. 11 is a chart for use in explaining the operation of a bit extraction circuit used in the sixth embodiment according to the invention; and FIG. 12 is a timing chart for use in explaining the operation of the pattern detection circuit, the bit rotator and the control circuit used in the six embodiment according to the invention.

PREFERRED EMBODIMENTS OF THE INVENTION

Now, preferred embodiments of the invention are explained with reference to the drawings.

Figure 1:
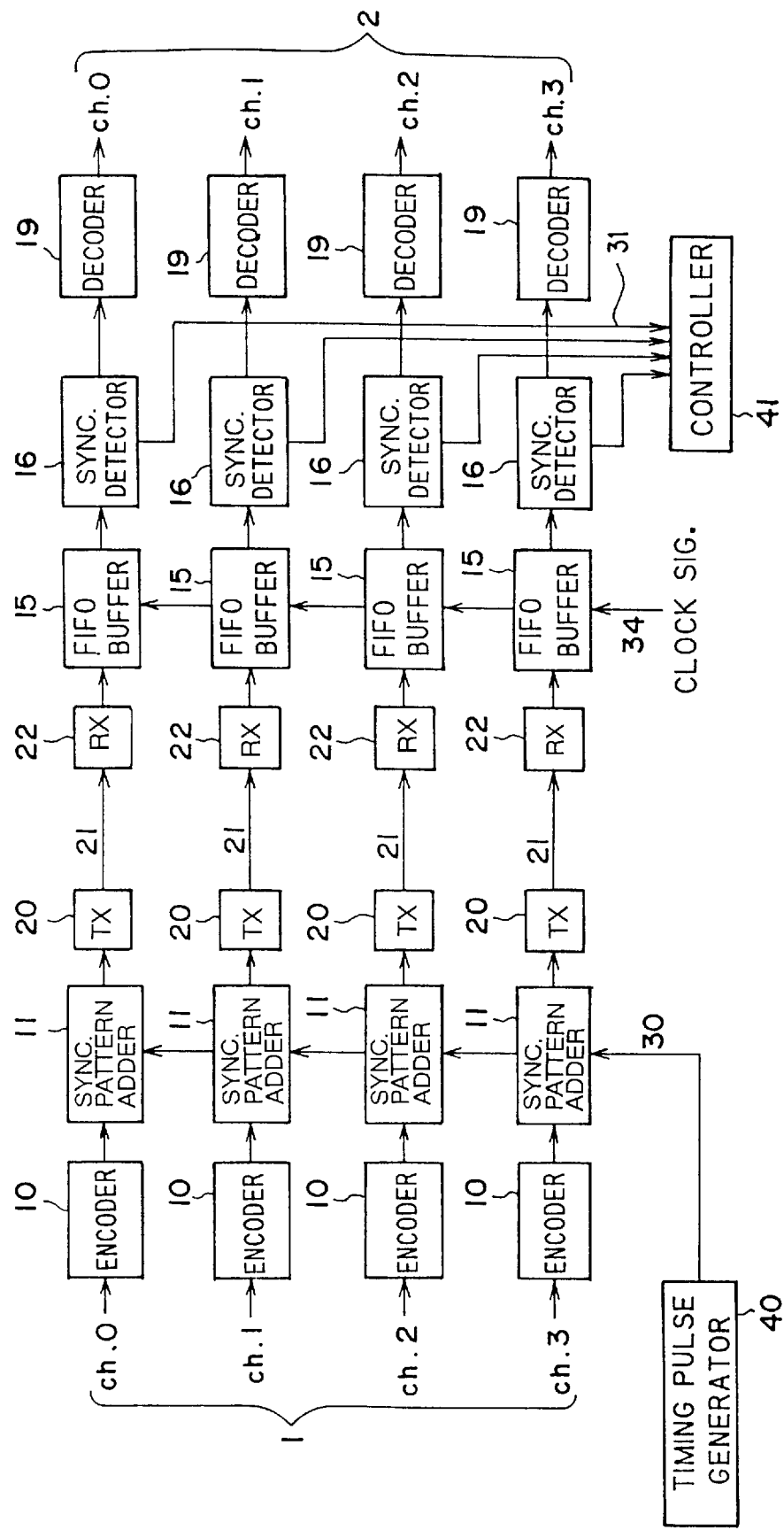
FIG. 1 is a block diagram showing a structure of a first embodiment according to the invention.

FIG. 1 is a block diagram showing a first embodiment of the invention. This first embodiment is an optical data link according to the first aspect of the invention. Here, parallel digital data, collectively designated at 1, are transmitted in 4 channels at a bit rate per channel of 150 Mb/sec. The parallel digital data 1 in each channel is first converted in each encoder 10 into a code not containing a pattern of "0101" before it is inputted to each synchronization pattern adder 11. At the leading end of data, a timing signal 30 from a timing pulse generator 40 is inverted from a low level to a high level (hereinafter the low level being referred to as "0" and the high level as "1"). The timing signal 30 is inputted simultaneously to four synchronization pattern adders 11. Thus, the pattern of "0101" is added as a synchronization pattern to the leading end of data. After addition of the synchronization pattern, each channel's parallel data is converted in each optical transmitter (TX) 20 into an optical signal, which is transmitted via each optical fiber 21. On the receiving side, each optical signal is converted in each optical receiver (RX) 22 into an electric signal to be written in each FIFO buffer 15. The data that have been written in this way in the individual FIFO buffers 15, are read out under control of an output clock signal 34 which is common to all the channels. Thus, skews within one time slot among the individual channels are absorbed here. The read-out data are inputted to synchronization pattern detectors 16. Each synchronization pattern detector 16 includes a 4-bit shift register and a logic circuit for synchronization pattern detection. Its synchronization pattern detection signal 31 is inverted from "0" to "1" when the shift register data and the synchronization pattern are in accord with one another by at least 3 bits. A controller 41 checks all the synchronization pattern detection signals 31, and it recognizes the detection of the synchronization pattern only when all the signals 31 are "1", or otherwise it does not. Finally, the data are decoded in decoders 19 into the original data, which are outputted after removal of the synchronization pattern.

In this way, it is possible to detect the synchronization pattern reliably irrespective of the occurrence of a transmission error within one bit in the synchronization pattern. Conversely, when the same pattern as the synchronization pattern arises due to the occurrence of a transmission error in the data section in a certain channel, the data is not recognized as the synchronization pattern because at this time no synchronization pattern is detected in the other channels.

Figure 2:
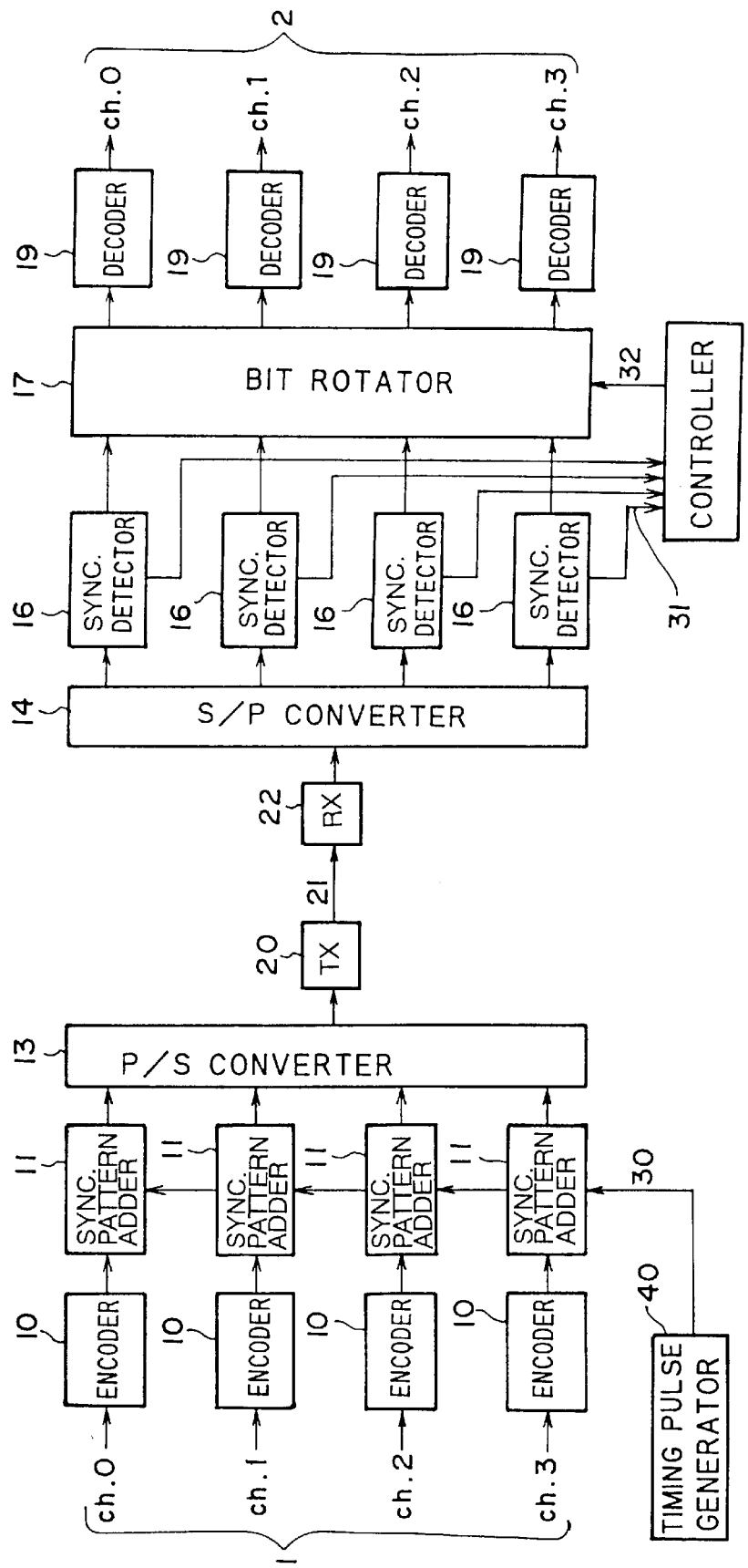
FIG. 2 is a block diagram showing a structure of a second embodiment according to the invention.
Figure 3:
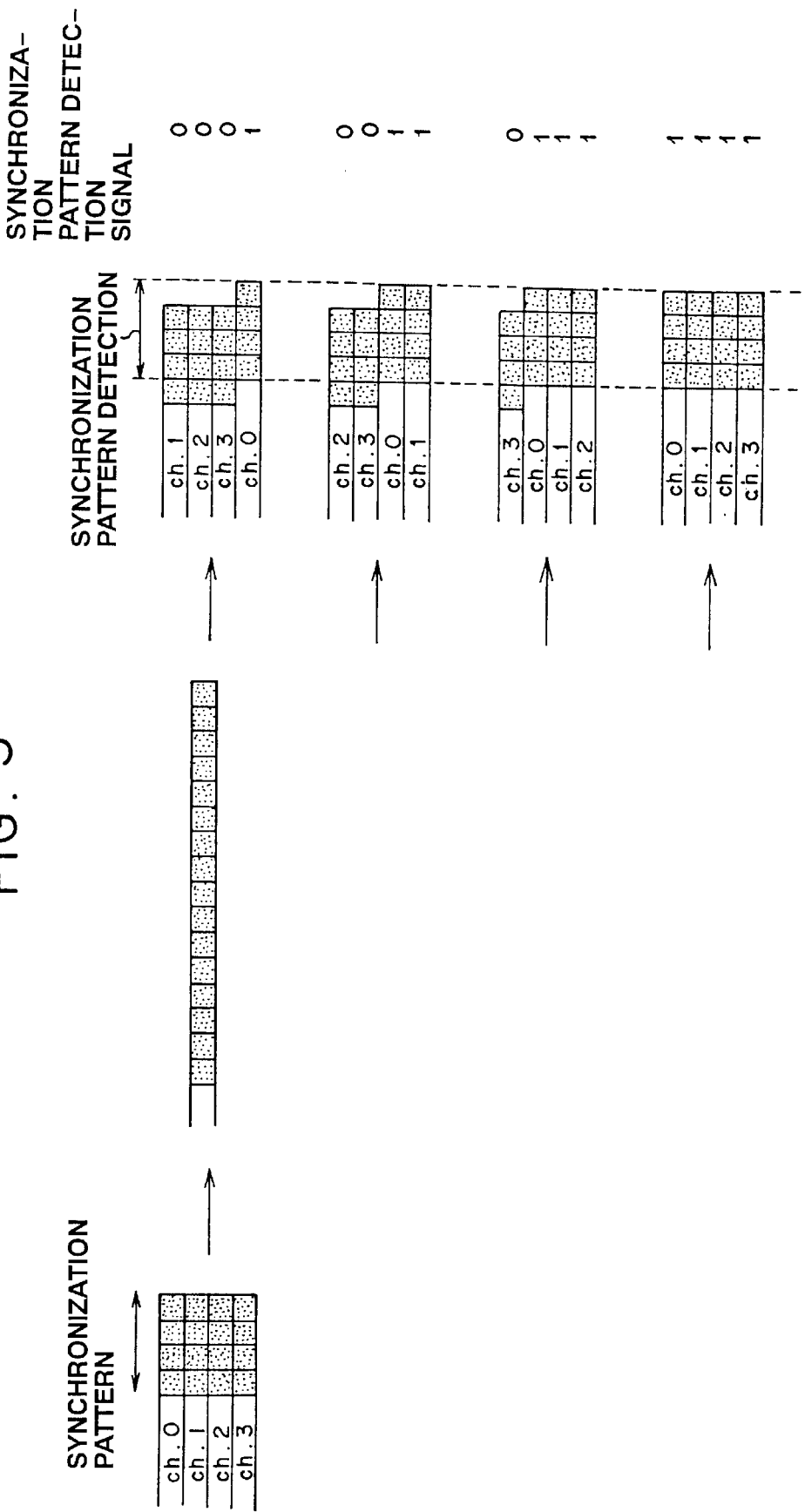
FIG. 3 is a timing chart for use in explaining a method for discriminating channel dispositions in the second embodiment according to the invention.

FIG. 2 is a block diagram showing a second embodiment of the invention. The second embodiment is a 600 Mb/sec. optical data link according to the first to third aspects of the invention. Here, 4 channel parallel digital data, collectively designated at 1, at a bit rate per channel of 150 Mb/sec. are transmitted after parallel-to-serial conversion. The parallel digital data 1 are first converted in encoders 10 into a code which does not include a pattern of "0101" before being inputted to synchronization pattern adders 11. At the leading end of data, a timing signal 30 from a timing pulse generator 40 is inverted from "0" to "1". The timing signal 30 is inputted simultaneously to four synchronization pattern adders 11. Thus, the pattern of "0101" is added as a synchronization pattern to the leading end of data. After the synchronization pattern addition, the parallel data are quadruplicated in a parallel-to-serial converter 13 into serial data at 600 Mb/sec. The serial data is then converted in each optical transmitter (TX) 20 into an optical signal to be transmitted via an optical fiber 21. On the receiving side, the optical signal is converted in an optical receiver (RX) 22 into an electric signal for restoring the 4 channel parallel data at 150 Mb/sec. per channel in a serial-parallel converter 14. Based on the timing of the serial-to-parallel conversion, the restored 4 channel parallel data are in one of four different channel dispositions as shown on the right side of FIG. 3. These parallel data are inputted to respective synchronization pattern detectors 16. The synchronization pattern detectors 16 each include a 4-bit shift register and a logic circuit for synchronization pattern detection, and their synchronization pattern detection signal 31 is inverted from "0" to "1" upon their detection of the synchronization pattern. In the timing shown in FIG. 3, the individual synchronization pattern detection signals 31 are "0001", "0011", "0111" and "1111", respectively, as shown in FIG. 3. It is possible to detect the present channel disposition by referring to these signals. A controller 41 controls a bit rotator 17 for bit interchange such that the channel disposition of the output parallel digital data 2 is in accord with that of the transmitting side parallel digital data 1. Finally, the data are decoded in decoders 19 to restore the original data, which are then outputted after the removal of the synchronization pattern.

In this embodiment, a deviation of data within one bit among the channels, as shown in FIG. 3, arises due to the timing of the serial-to-parallel conversion. Even in such a case, reliable synchronization pattern detection is ensured, thus permitting the following operations of the synchronization pattern detectors 16 and the controller 41. When the shift register data and the synchronization pattern are in accord with each other for at least 3 bits, the synchronization pattern detection signal 31 of the synchronization pattern detector 16 inverts its synchronization pattern detection signal 31 to "1" and holds this signal for one time slot before inverting it back to "0". When any one of the 4 channel synchronization pattern detection signals 31 becomes "1", in the next time slot the controller 41 refers to all the synchronization pattern detection signals 31. Only when all the signals 31 are "1", the controller 41 recognizes the synchronization pattern detection, or otherwise it does not. In this way, reliable synchronization pattern detection can be obtained, and also the channel disposition can be determined. As a consequence, the time slot controller 41 updates a bit rotator control signal 32. The bit rotator 17 also has a role of aligning packets by providing a delay of one time slot to channels ahead of the other channels by one slot, i.e., the channels with the synchronization pattern detection signals thereof in FIG. 3 being "1".

In the above method, even if a transmission error of one bit arises in the synchronization pattern, the packet will not become ineffective, but it is possible to realize a parallel data link, in which the transmitted and received data channels are reliably in accord with one another.

Figure 4:
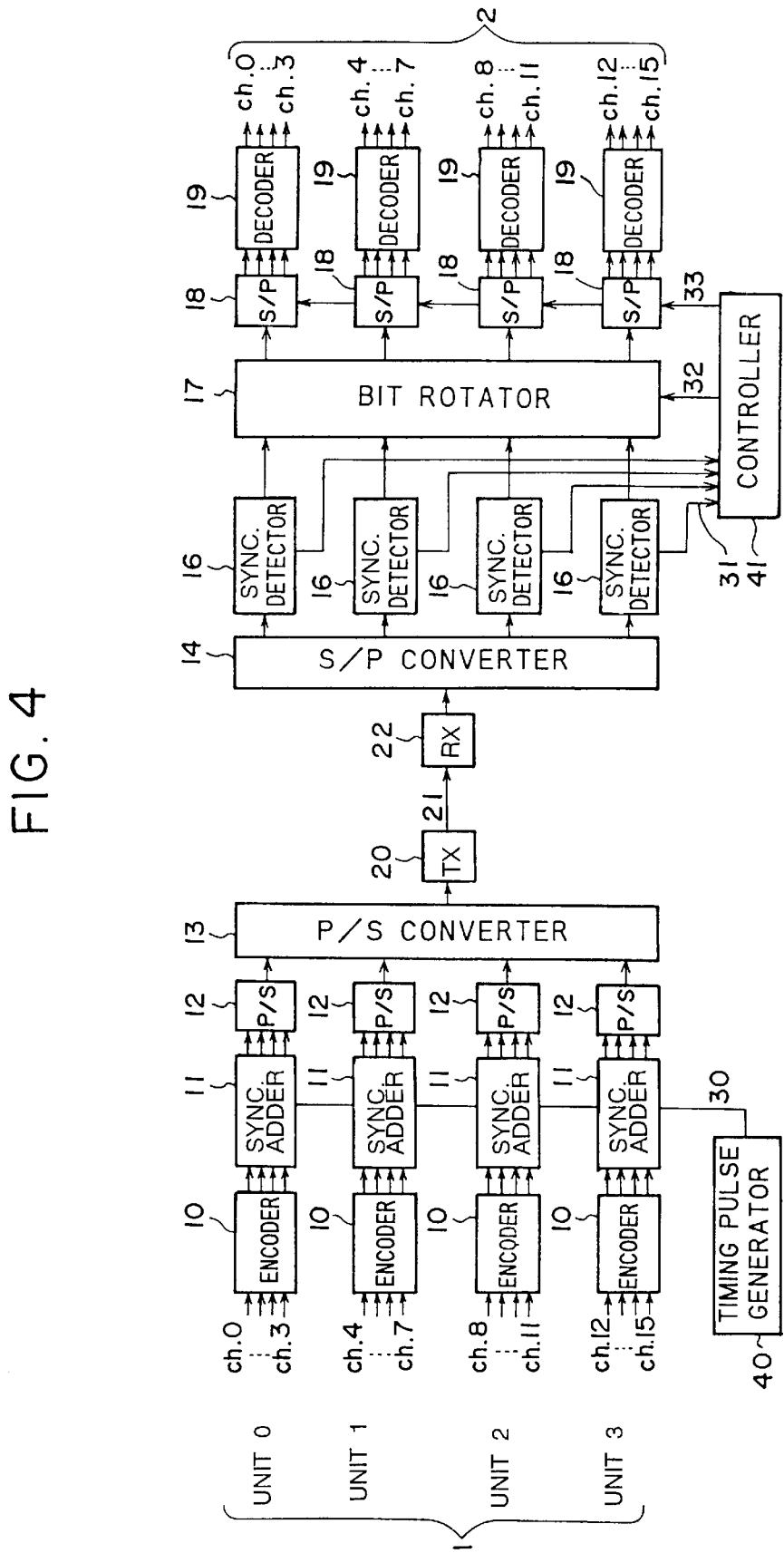
FIG. 4 is a block diagram showing a structure of a third embodiment according to the invention.

FIG. 4 is a block diagram showing a third embodiment of the invention. In the third embodiment, according to the first to third aspects of the invention, each channel parallel digital data to be transmitted is a signal obtained through parallel-to-serial conversion of lower bit rate parallel data, that is, parallel-to-serial conversion is made in two stages on multiple channel parallel digital data. More specifically, 16 channel parallel digital data at a bit rate per channel of 125 Mb/sec. are divided into units each of 4 channels. Each unit undergoes 4:1 parallel-to-serial conversion to obtain 4channel parallel digital data at a bit rate per channel of 500 Mb/sec. Four such parallel data further undergo 4:1 parallel-to-serial conversion to obtain a single serial data train at 2 Gb/sec. Conversely, on the receiving side, the 1:4 serial-to-parallel conversion is made in two stages to restore the original parallel digital data.

First, the parallel digital data, collectively designated at 1, are converted in encoders 10 into codes free from a pattern of "0101" before being inputted to synchronization pattern adders 11. At the leading end of data, a first timing signal 30 from a timing pulse generator 40 is inverted from "0" to "1". The first timing signal 30 is inputted simultaneously to each of the four synchronization pattern adders 11. At this time, in the synchronization pattern adder for group 0, for instance, signals "0", "1", "0" and "1" are added for respective channels 0 to 3. The resultant data are converted in the next parallel-to-serial converter 12 into a serial data of "0101". This data constitutes the synchronization pattern. Likewise, the synchronization pattern "0101" is added in the synchronization pattern adders for the other groups 1 to 3. The parallel data after the synchronization pattern addition is quadruplicated in first parallel-to-serial converters 12 and then further quadruplicated in a second parallel-to-serial converter 13 before the transmission. The structure from the second parallel-to-serial converter 13 up to the receiving side bit rotator 17 is entirely the same as in the second embodiment and thus can be realized with the same control system. The bit rotator 17 outputs 4 channel parallel data, which are the same as the data inputted to the second parallel-to-serial (P/S) converter 13 and are inputted to second serial-to-parallel (S/P) converters 18. The second serial-to-parallel (S/P) converters 18 have to carry out serial-to-parallel conversion such that data immediately after the synchronization pattern is of the channel of the lowest channel number. When a controller 41 detects the synchronization pattern, it updates a bit rotator control signal 32, and then after the lapse of 2 time slots it resets the second serial-to-parallel (S/P) converters 18 by using a second timing signal 33. Because of a delay of two time slots in data at the bit rotator 17, in the time slot immediately after the resetting of the second serial-to-parallel (S/P) converters 18, the data bit immediately after the synchronization pattern is inputted to each second serial-to-parallel (S/P) converter 18. In the above way, frame synchronization is established in the second serial-to-parallel (S/P) converters 18, and the channels of the output parallel digital data 2 are in accord with those of the parallel digital data 1 inputted on the transmitting side.

Figure 5:
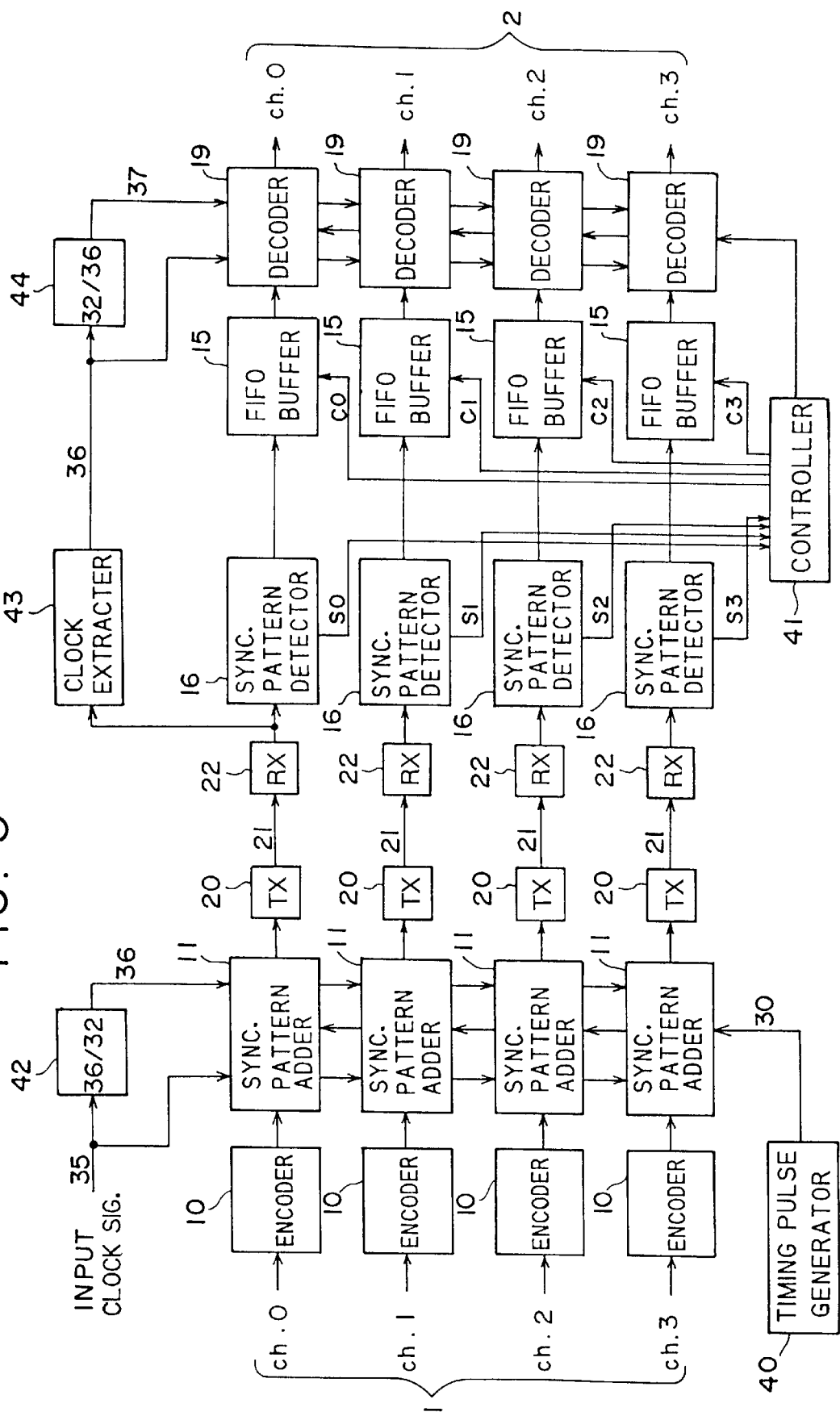
FIG. 5 is a block diagram showing a structure of a fourth embodiment according to the invention.

FIG. 5 is a block diagram showing a fourth embodiment of the invention. The fourth embodiment is an optical data link according to the fourth aspect of the invention. Here, 4 channel parallel digital data 1 at a bit rate per channel of 150 Mb/sec. are transmitted, and skew compensation is also realized. A clock converter 42 generates a transmission clock signal 36 by multiplying the frequency of an input clock signal 35 by 36/32. The parallel digital data 1 are converted in encoders 10 into codes free from a pattern of "0101" before being inputted to synchronization pattern adders 11. In the synchronization pattern adders 11, data are written synchronously with the input clock signal 35 and read out synchronously with the transmission clock signal 36. Thus, the data outputted from the synchronization pattern adder 11 has a blank for 4 time slots for every 32 time slots. The synchronization pattern adder 11 adds a pattern of "0101" as synchronization pattern in the blank portion.

Meanwhile, a timing pulse generator 40 generates a timing signal 30, which is "1" in only one of 32 time slots and "0" otherwise and is inputted simultaneously to the four synchronization pattern adders 11. The synchronization pattern is added when the timing signal 30 is inverted to "1", that is, it is added simultaneously for the 4 channels. After the synchronization pattern addition, the parallel data are converted in optical transmitters 20 into optical data which are transmitted via optical fibers 21. On the receiving side, the optical data are converted in optical receivers 22 into electric data to be inputted to synchronization pattern detectors 16. Each of the synchronization pattern detectors 16 includes a 4-bit shift register and a logic circuit for synchronization pattern detection. Their synchronization pattern detection signals S0 to S3 are inverted from "0" to "1" when their shift register data and synchronization pattern are in accord with each other for at least 3 bits. The synchronization pattern detection signals S0 to S3 are inputted to a controller 41.

Figure 6:
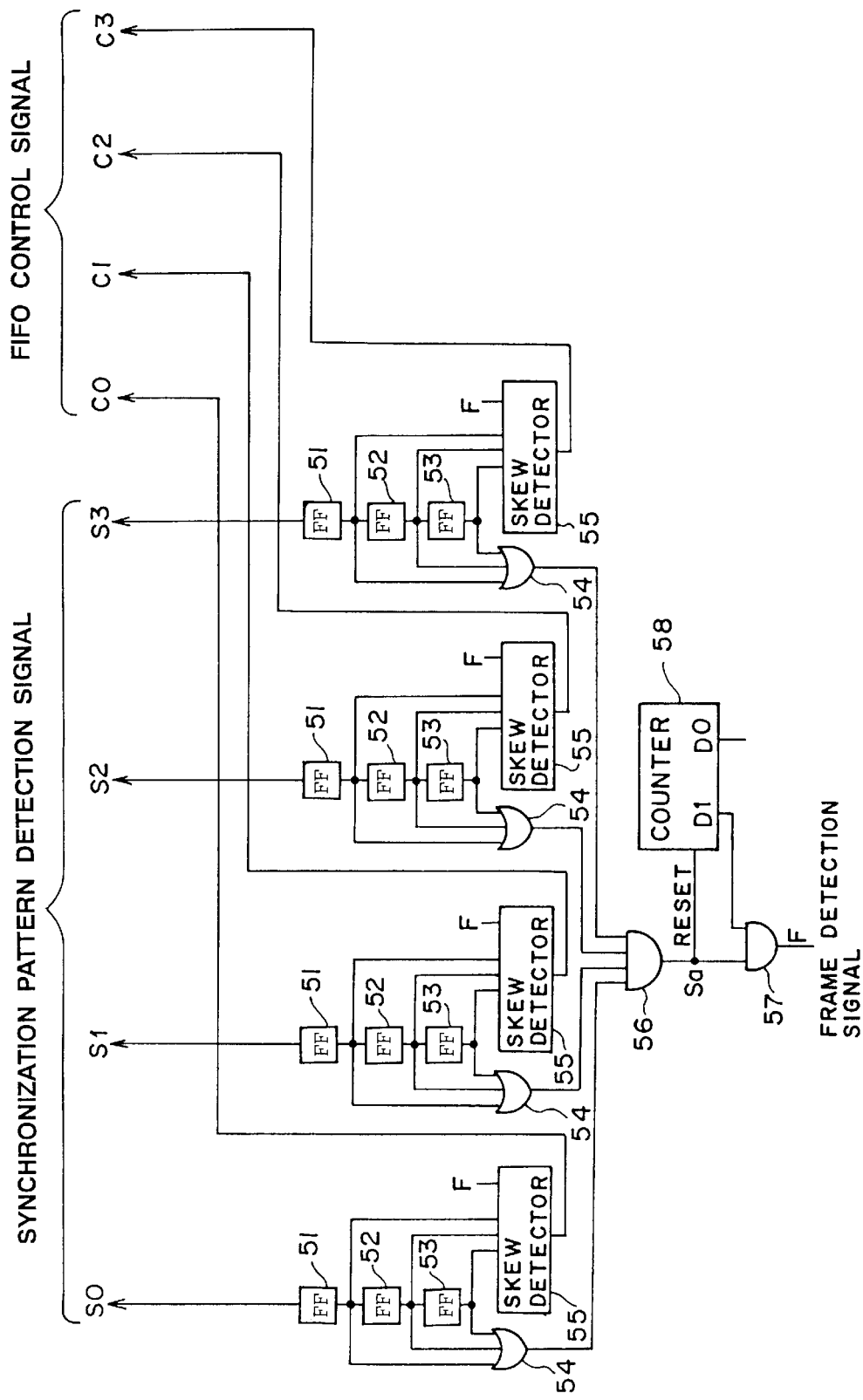
FIG. 6 is a diagram showing a configuration of a control circuit used in the fourth embodiment and a fifth embodiment according to the invention.
Figure 7:
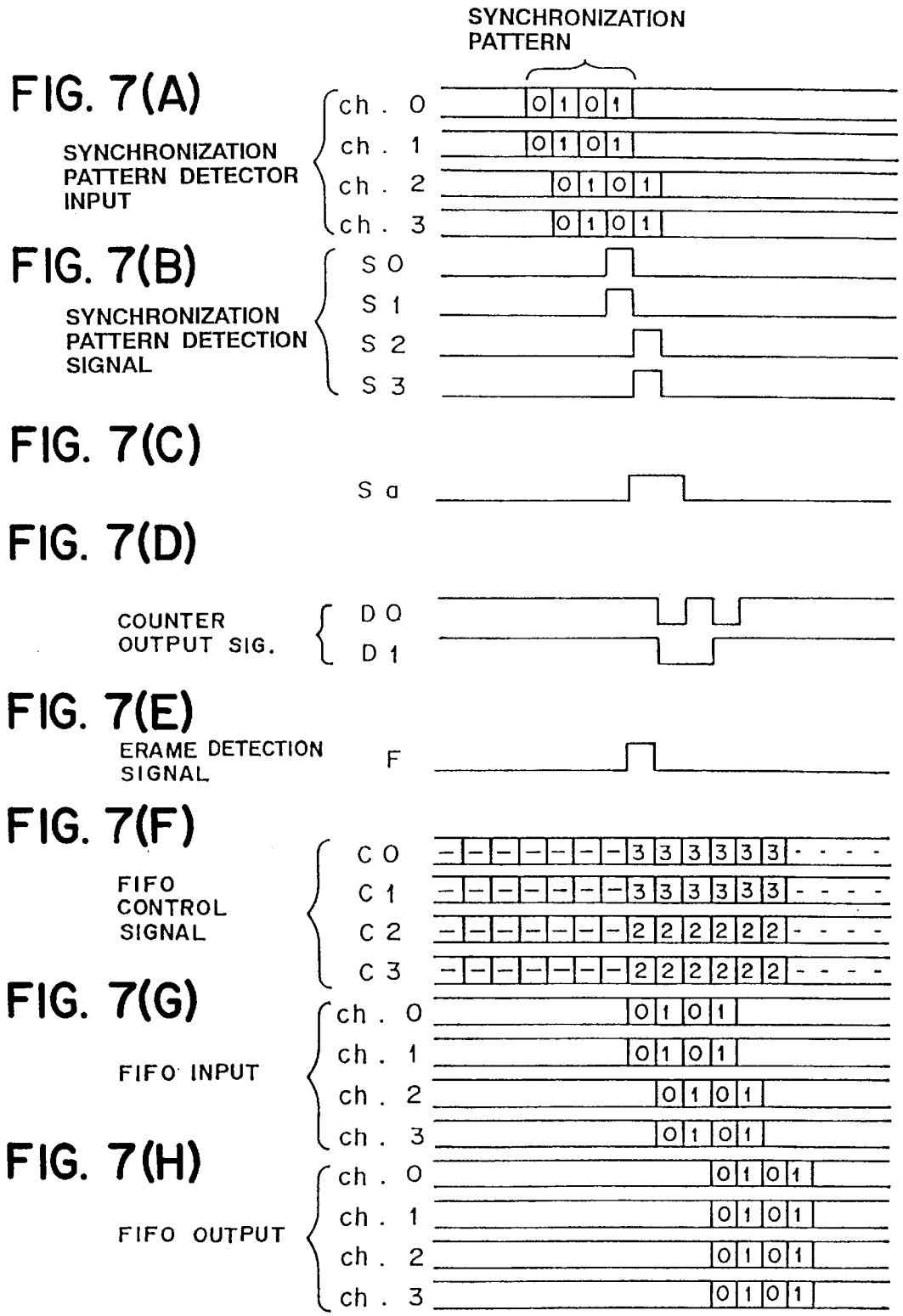
FIG. 7 is a timing chart for use in explaining the operation of the control circuit used in the fourth and fifth embodiments according to the invention.

The controller 41 has a structure as shown in FIG. 6. The operation of the controller 41 will now be described with reference to a timing chart shown in FIG. 7. It is assumed that data containing synchronization patterns have been inputted to the individual channel synchronization pattern detectors 16 at timings as shown in FIG. 7(A). In this example, a transmission skew of one time slot is present between the channels 0 and 1 and also between the channels 2 and 3. The synchronization pattern detection signals S0 to S3 are stored sequentially in first to third flip-flops (FFs) 51 to 53 for each time slot as shown in FIG. 7(B). Each of OR gates 54 takes a logical OR of the three flip-flop outputs, and a first AND gate 56 takes a logical AND of the outputs of the individual channels' OR gates 54. Thus, the output of the first AND gate 56, which is an overall synchronization pattern detection signal Sa, is changed as shown in FIG. 7(C). A counter 58 has 2 bit outputs of "D0" and "D1" (the output "D1" being the upper bit), as shown in FIG. 7(D) and it is reset when the overall synchronization pattern detection signal Sa is reset from "0" to "1". A second AND gate 57 outputs a frame detection signal F, as shown in FIG. 7(E) which is the AND of the overall pattern detection signal Sa and the output "D1" from the counter 58. With the above mechanism, the frame detection signal F is "1" for one time slot. The frame detection signal F is inputted to an associated skew detector 55. When the frame detection signal F becomes "1", each skew detector 55 outputs one of the FIFO control signals "C0" to "C3" as shown in FIG. 7(F) in accordance with the outputs of its associated flip-flops 51 to 53. More specifically, it outputs an output of "2" when the output of the flip-flop (FF) 51 is "1", an output of "3" when the output of the flip-flop (FF) 52 is "1" and an output of "4" when the output of the flip-flop (FF) 53 is "1". Each FIFO buffer 15 provides to the data a delay of 2 time slots when an FIFO control signal of "2" is outputted, of 3 time slots when a signal of "3" is outputted, and of 4 time slots when a signal of "4" is outputted. Thus, in the example of FIG. 7(G), a delay of 3 time slots is provided for the channels 0 and 1, and a delay of 2 time slots for the channels 2 and 3. It will be seen that in the data outputted from the FIFO buffers 15, skews among the channels have been absorbed as shown FIG. 7(H).

Finally, the data are decoded in decoders 19 in the converse way to the encoding conducted in the encoders 10. Meanwhile, a clock extractor 43 extracts a transmission clock signal 36 from the output of the optical receivers 22. A second clock converter 44 generates an output clock signal 37 by multiplying the frequency of the transmission clock signal 36 by 32/36. In the decoders 19, data are written in synchronism to the transmission clock signal 36 and read out in synchronism to the output clock signal 37. Thus, 4 time slots among 36 time slots of the input data become redundant, thus permitting synchronization pattern removal. The synchronization pattern removal is timed to the timing of the frame detection signal F outputted from the controller 41. The parallel digital data 2 outputted from the decoders 19 in the above way, are perfectly in accord with the parallel digital data 1 inputted on the transmitting side unless no transmission error occurs.

In this embodiment, non-accord by one bit is allowed in the synchronization pattern detectors. It is thus possible to obtain reliable synchronization pattern detection even when a transmission error within one bit occurs in the synchronization pattern. Conversely, when a transmission error occurs in other data than the synchronization pattern in a certain channel, and then, the data becomes the same pattern as the synchronization pattern, no synchronization pattern is detected at this time in the other channels. There is thus no possibility that data is mistaken as the synchronization pattern. Further, skew compensation can also be realized as shown in FIG. 7.

Figure 8:
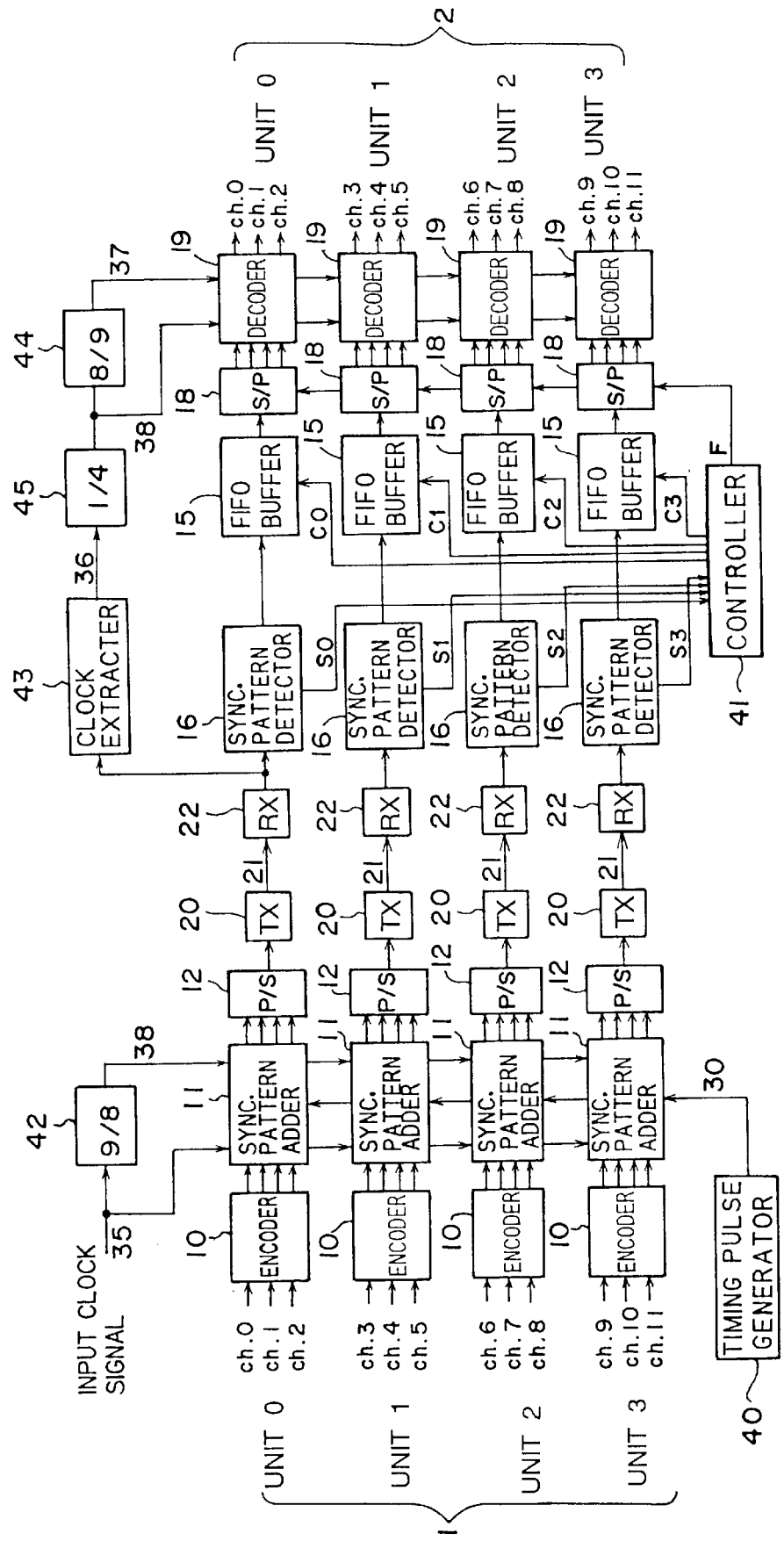
FIG. 8 is a block diagram showing a structure of a fifth embodiment according to the invention.

FIG. 8 is a block diagram showing a fifth embodiment of the invention. This fifth embodiment is an optical data link according to the fifth aspect of the invention. Here, 12 channel digital data at a bit rate per channel of 150 Mb/sec. are transmitted, and also skew compensation is realized. A clock converter 42 generates a low frequency clock signal by multiplying the frequency of an input clock signal 35 by 9/8. Parallel digital data 1 covering a total of 12 bits are divided into units each of 3 bits, each unit being inputted to each encoder 10. Each encoder 10 converts the 3-bit parallel data into 4-bit parallel data through 3B4B encoding. In the encoding, the pattern of "0101" is not used. The parallel data obtained through the encoding are inputted to synchronization pattern adders 11. In the synchronization pattern adders 11, data are written in synchronism to the input clock signal 35 and read out in synchronism to the low frequency clock signal 38. Thus, in the output signals of the synchronization pattern adders 11 a blank of one time slot is produced for every 9 time slots of the input clock. In the synchronization pattern adders 11, signals "0", "1", "0" and "1" are added in the blank time slot for the channels 0 to 3 (in the case of the unit 0). In the next stage parallel-to-serial (P/S) converters 12, these signals are converted into a serial signal of "0101" which constitutes the synchronization pattern.

Meanwhile, a timing pulse generator 40 generates a timing signal 30, which is "1" during one of 9 time slots and "0" otherwise and is inputted simultaneously to the 4 synchronization pattern adders 11. The synchronization pattern is added when the timing signal 30 becomes "1". It is thus added for the 4 channels at a time. After the synchronization pattern addition, the parallel data are converted in optical transmitters 20 into optical data which are transmitted via optical fibers 21. On the receiving side, the optical data are converted in optical receivers 22 into electric data to be inputted to synchronization pattern detectors 16. The synchronization pattern detectors 16 each includes a 4-bit shift register and a logic circuit for synchronization pattern detection, and their synchronization pattern detection signals S0 to S3 are inverted from "0" to "1" when their shift register data and the pattern of the synchronization pattern are in accord with each other for at least 3 bits. The synchronization pattern detection signals S0 to S3 are inputted to a controller 41. The controller 41 is entirely the same in the construction and operation as in the case of the fourth embodiment (except that, in this embodiment, the units 0 to 3 take the place of the channels 0 to 3 in FIG. 7). Thus, skews that have occurred among the group data inputted to the synchronization pattern detectors 16 as shown in the uppermost part of FIG. 7, have been absorbed when data are outputted from FIFO buffers 15 as shown in the lowermost part of FIG. 7. The data outputted from the FIFO buffers 15 are converted in serial-to-parallel (S/P) converters 18 into 4-bit parallel data. At this time, the serial-to-parallel converters 18 can realize frame synchronization by carrying out the serial-to-parallel conversion in a timed relation to the timing of frame detection signal F outputted from the controller 41.

Finally, the data are decoded by 4B3B decoding in decoders 19. Meanwhile, a clock extractor 43 extracts a transmission clock signal 36 from the output of the optical receivers 22. The transmission clock signal 36 is converted into a low frequency clock signal 38 in a clock frequency divider 45 by dividing the frequency into four. The low frequency clock signal 38 is further converted in a second clock converter 44 into an output clock signal 37 by frequency multiplication by 8/9. In the decoders 19, data are written in synchronism to the low frequency clock signal 38 and read out in synchronism to the output clock signal 37. Thus, one time slot becomes redundant for every 9 time slots of the input data, thus permitting removal of the synchronization pattern. In the above way, the parallel digital data outputted from the decoders 19 are in perfect accord with the parallel digital data inputted on the receiving side.

In this embodiment, non-accord of one bit is allowed in the synchronization pattern detectors. It is thus possible to obtain reliable synchronization pattern detection even if a transmission error within one bit occurs in the synchronization pattern. Conversely, when a data other than the synchronization pattern is mistaken to be a synchronization pattern in a certain unit, the data is not recognized to be the synchronization pattern because no synchronization pattern is detected in the other units. Further, skew compensation and frame synchronization can be realized using the synchronization pattern.

Figure 9:
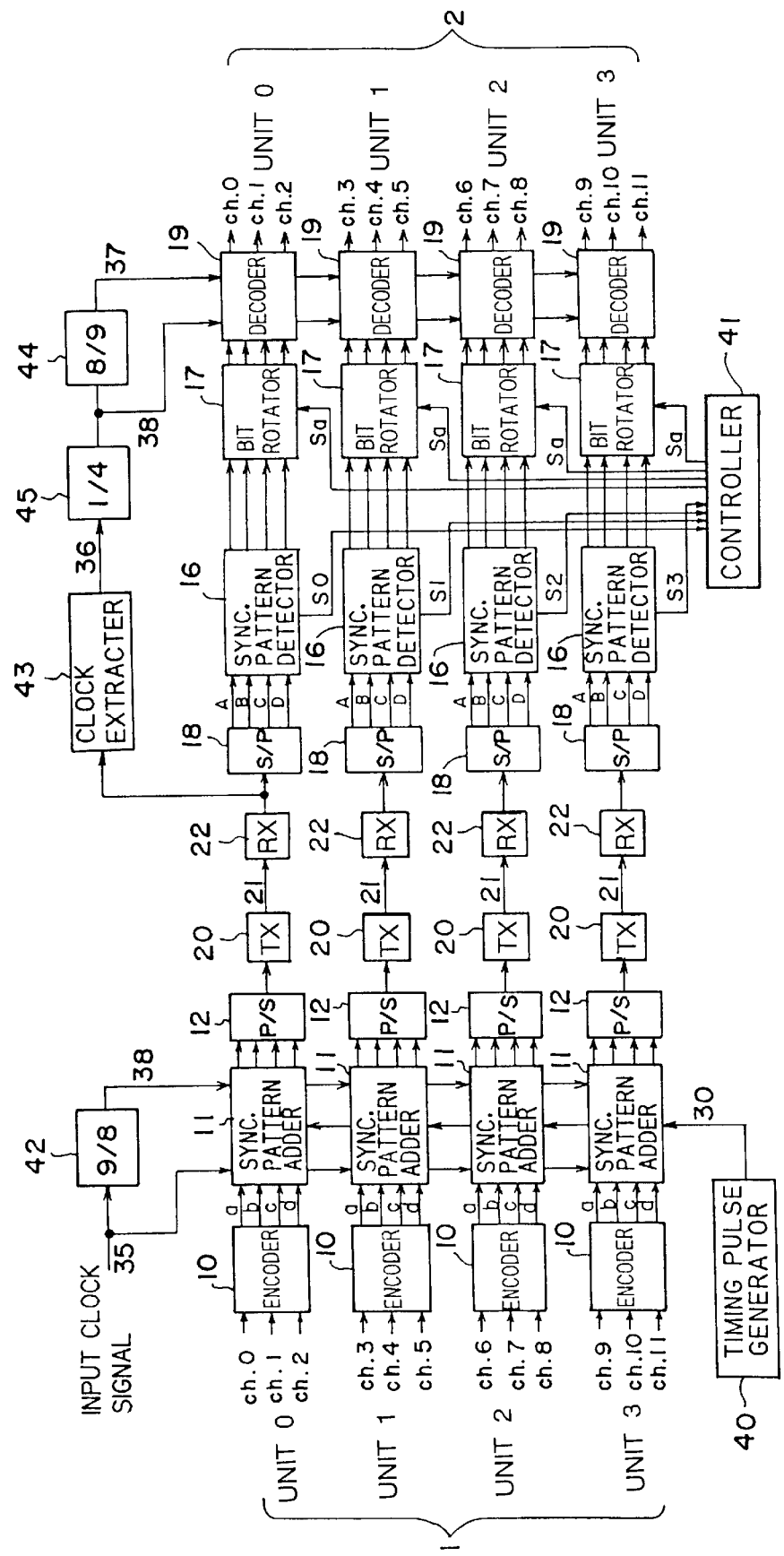
FIG. 9 is a block diagram showing a structure of a sixth embodiment according to the invention.

FIG. 9 is a block diagram showing a sixth embodiment of the invention. This sixth embodiment is an optical data link according to the fifth aspect of the invention. As is the case with the fifth embodiment, 12 channel digital data at a bit rate per channel of 150 Mb/sec. are transmitted, and skew compensation is also realized. In the transmitting side construction, this embodiment and the fifth embodiment are entirely the same, and the two embodiments are different only in the receiving side frame synchronization and skew compensation. The embodiment thus will be described only in connection with the receiving side.

Figure 10:
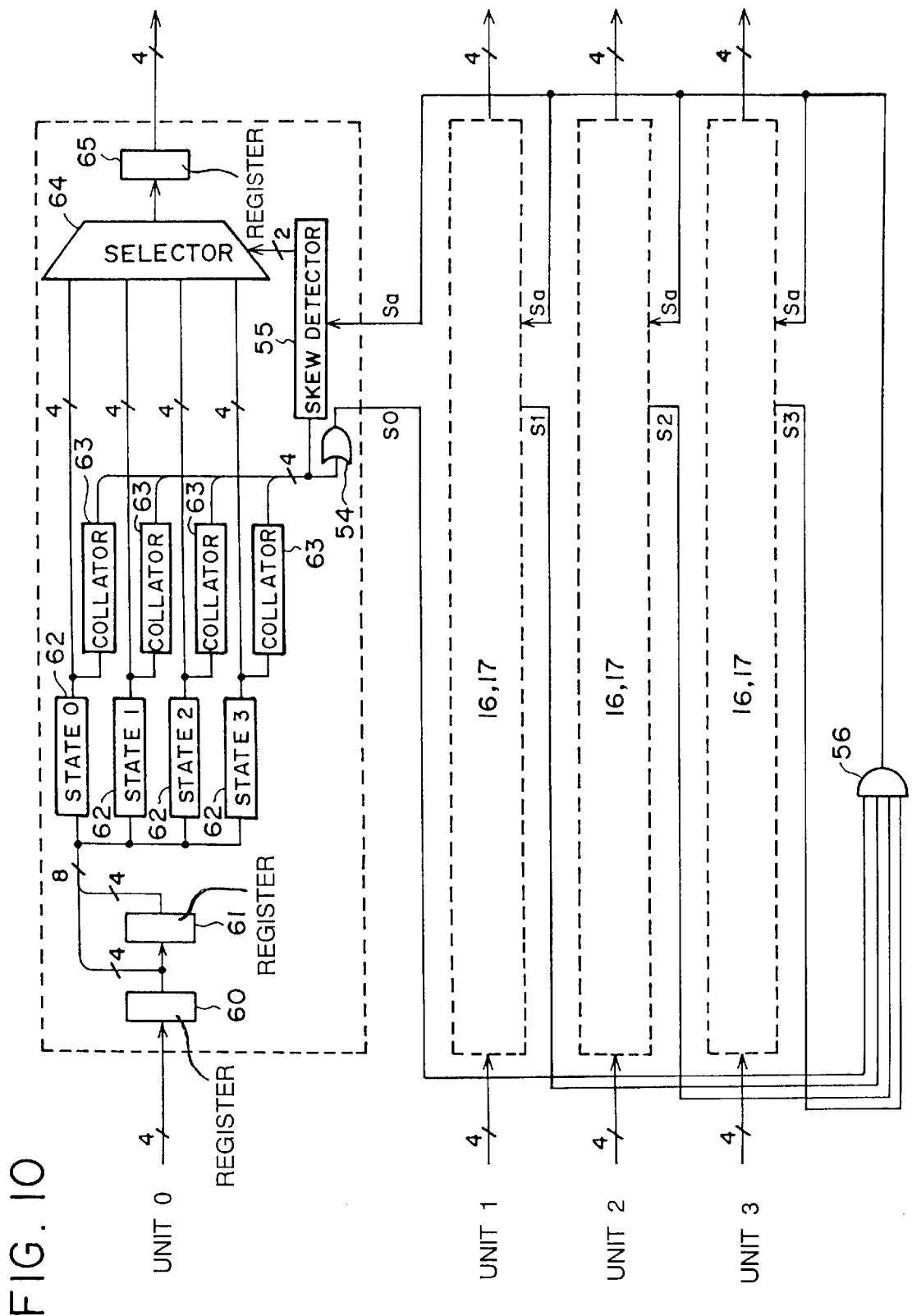
FIG. 10 is a diagram showing structural details of a pattern detection circuit, a bit rotator and a control circuit used in the six embodiment according to the invention.

On the receiving side, the optical data that have been transmitted via the optical fibers are converted in optical receivers 22 into electric data for conversion in serial-to-parallel (S/P) converters 18 into parallel data. Here the frame synchronization is not considered at all. Therefore, in many cases channel interchange occurs. The parallel data are inputted to synchronization pattern detectors 16. The synchronization pattern detectors 16 can detect the synchronization pattern with a mechanism to be described later in the case of the occurrence of channel interchange at the time of the serial-to-parallel conversion. The result of detection is transmitted as synchronization pattern detection signals S0 to S3 to a controller 41. The controller 41 detects the synchronization pattern groups with reference to all the synchronization pattern detection signals S0 to S3 and controls a bit rotator 17 according to the result of detection. The bit rotator 17 effects channel interchange such that the same parallel data channel arrangement as on the transmitting side can be obtained. It will be seen that the synchronization pattern detectors 16, controller 41 and bit rotator 17 realize skew compensation as well as frame synchronization. FIG. 10 shows a detailed structure example of the synchronization pattern detectors 16, bit rotator 17 and controller 41. Actually, the individual circuits are not clearly distinguished from one another, and they fulfill their respective functions collectively. The operations of the circuits will be described in detail with reference to the time chart of FIG. 12.

It is assumed that data in the units 0 to 3 are inputted to receiving side serial-to-parallel (S/P) converters 18. Without the occurrence of any skew, the synchronization patterns of the individual groups are simultaneously inputted to the serial-to-parallel (S/P) converters 18. In this case, however, a deviation by one time slot as shown in FIG. 12(A) arises between adjacent units due to skews arising in the transmission line. The data which are obtained after the serial-to-parallel conversion have interchanged channel dispositions in individual units. In FIG. 12, a to d mean output ports a to d in the encoders 10 shown in FIG. 9, and A to D mean output ports A to D in the serial-to-parallel converters 18. Normally, data a is outputted from the port A. However, due to the channel interchange, data d, c and b are outputted in the units 0 to 2, respectively. To a first input register 60 are inputted 4 bit parallel data, which are registered in the next time slot in a second input register 61. Bit extractors 62 extract 4 bits from 8 bits registered in the two input registers. At this time, the individual four bit extractors 62 respectively extract different 4 bits. The four different ways of extraction are referred to as "state 0" to "state 3", respectively, and defined such as shown respectively in FIGS. 11(A)–11(D) (extracted bits being shown shaded). Each collator 63 collates the extracted 4-bit pattern with the synchronization pattern "0101", and it provides output "1" if the two patterns are in accord with each other for at least 3 bits while providing "0" otherwise. The collator output signals are inputted to an OR gate 54. The four OR gates 54 provide synchronization pattern detection signals S0 to S3 as their outputs. An AND gate 56 takes a logical AND operation of the synchronization pattern detection signals S0 to S3 to provide a synchronization pattern group detection signal Sa. That is, the synchronization pattern group detection signal Sa is "1" when and only when the synchronization pattern is detected in all the units.

In the case of FIG. 12(C) the collator outputs corresponding to the state 3 of the unit 0, the state 2 of the unit 1, the state 1 of the unit 2 and the state 0 of the unit 3, simultaneously become "1". At this time, the synchronization pattern group detection signal Sa also becomes "1" as shown in FIG. 12(D). The synchronization pattern group detection signal Sa is inputted to a skew detector 55 for each unit. When the overall synchronization pattern group detection signal Sa becomes "1", each skew detector 55 outputs, with reference to the four collator outputs, 2-bit selector control signal of "00" in the case where the states 0 to 3 are "1", "0", "0" and "0"; "01" in the case where the states 0 to 3 are "0", "1", "0" and "0"; "11" in the case where the states 0 to 3 are "0", "0", "1" and "0"; and "11" in the case where the states 0 to 3 are "0", "0", "0" and "1". Each selector 64 selects respective one of the ports of the states 0 to 3 when the selector control signal is "00", "01", "10" or "11". Thus, the input data to an output register 65 are as shown in FIG. 12(E), and frame synchronization and skew compensation are realized.

The data outputted from the bit rotators 17 are decoded by 4B3B decoding in decoders 19. Meanwhile, a clock extractor 43 extracts a transmission clock signal 36 from the output of the optical receivers 22. The transmission clock signal 36 is converted to a low frequency clock signal 38 through frequency division by 4 in a clock frequency divider 45. A second clock converter 44 generates an output clock signal 37 through frequency multiplication of the signal 38 by 8/9. In the encoders 19, data are written in synchronism to the low frequency clock signal 38 and read out in synchronism to the output clock signal 37. Thus, one time slot becomes redundant for every 9 time slots of the input data, thus permitting synchronization pattern removal. As in the above way, the parallel digital data 2 outputted from the decoders 19 are in perfect accord with the parallel digital data 1 inputted on the transmitting side unless transmission error occurs.

In this embodiment, non-accord of one bit is allowed in the synchronization pattern detectors, and thus it is possible to obtain reliable synchronization pattern detection even in the case of the occurrence of a transmission error within one bit in the synchronization pattern. Conversely, even in the case when a data portion other than the synchronization pattern is mistaken to be a synchronization pattern in a certain unit, the data will not be recognized as the synchronization pattern because at this time no synchronization pattern is detected in the other units. Further, skew compensation and frame synchronization can be realized by using the synchronization pattern.

Various other embodiments than the above six embodiments are also conceivable. For example, while the previous six embodiments all used optical transmission, it is also possible to transmit electric data as such by using coaxial cables or twisted pair lines. The bit rate of data, number of channels, number of multiplying stages, length and pattern of the synchronization pattern, etc. are of course not limited to those explained above, but may be selected as desired.

Further, while in the above six embodiments the synchronization pattern was added simultaneously for the individual channels on the transmitting side, the addition may not be simultaneous. For example, it is possible to effect synchronization pattern addition on the transmitting side by shifting bits by 8 bits for each channel and effect comparison of the received data series on the receiving side by shifting bits by 8 bits for each channel.

Further, the method of synchronization pattern detection is not limited to that described before in connection with the previous six embodiments, but synchronization pattern groups and received pattern groups may be group-to-group collated, while allowing some errors. For example, it is conceivable to connect all the bits of all the channel synchronization pattern detector shift registers to a multitude decision circuit for collective collation of signal to the synchronization pattern group and determine that the synchronization pattern has been detected if the number of in-accord bits is greater than a certain threshold value.

Further, there are further methods of channel discrimination than that used in the second and third embodiments. For example, it is conceivable to use a synchronization pattern having a unique pattern for each channel or incorporate a channel identifier in data.

As has been described in detail in the foregoing, according to the invention, a synchronization pattern group is generated on the transmitting side through addition of synchronization pattern to digital data of a plurality of channels at predetermined timings, a received pattern group is formed on the receiving side through extraction of a received pattern equal in length to the synchronization pattern in each channel, and the received pattern group and the synchronization pattern group are collated. If the number of non-matching bits is found to be less than a certain threshold value, detection of synchronization pattern is recognized. It is thus possible to obtain reliable synchronization pattern detection even in the case of the occurrence of a transmission error in the synchronization pattern.

For example, in the system described before in connection with the first embodiment, an error of one bit is allowed in the synchronization pattern detectors 16. Thus, synchronization pattern detection is possible even when a transmission error of one bit occurs in the synchronization pattern. However, the controller 41 does not recognize any synchronization pattern unless all the synchronization patterns are simultaneously detected by the synchronization pattern detectors. Thus, the probability of judging parts other than the synchronization pattern to be the synchronization patterns is so low as to be negligible.

In the second embodiment of the invention, the second aspect of the invention is applied to the transmission of parallel digital data with the synchronization pattern group added thereto after the parallel-to-serial conversion. It is thus possible to reduce the number of signal lines and, unlike the first embodiment, readily realize the very small skew state as the prerequisite of the synchronization pattern detection system used without use of any FIFO buffer.

Further, by applying the third aspect of the invention it is possible to realize reliable channel discrimination without provision of any channel discriminator or the like.

In the fourth embodiment of the invention, the fourth aspect of the invention is applied to realize compensation of skew exceeding one time slot. Here, on the transmitting side, a synchronization pattern group is generated through synchronization pattern addition for all channels at predetermined timings and, on the receiving side, the individual synchronization patterns can be detected reliably through synchronization pattern group detection. Further, through comparison of the synchronization pattern detection timing in each channel it is possible to obtain skew detection and realize reliable skew compensation.

In the fifth and sixth embodiments, the fifth aspect of the invention is applied to simultaneously realize the skew compensation and frame synchronization. According to the invention, like the fourth aspect thereof, synchronization pattern group detection on the receiving side permits reliable detection of each synchronization pattern and simultaneously permits skew detection to realize the skew compensation. Further, it is possible to realize the frame synchronization in the serial-to-parallel conversion by using the obtained skew information. It is thus possible to realize a very strong frame synchronization system, which has endurance with respect to both the transmission errors and the skews.

What is claimed is:

1. A method for transmitting and receiving parallel digital data in a plurality of channels, said method comprising the steps of:

adding a synchronization pattern to digital data in each said channel at a proper timing at a transmit side;

extracting from each channel a received pattern equal in length to said synchronization pattern at a common proper timing at a receive side;

determining for each said channel said received pattern as being matched with said synchronization pattern if the degree of dissimilarity between said received pattern and said synchronization pattern as a result of comparison therebetween is less than a first threshold value; and signalling detection of said synchronization pattern when the number of channels determined to have their received patterns matched with said synchronization pattern is more than a second threshold value.

2. A method for transmitting and receiving parallel digital data in a plurality of channels, said method comprising the steps of:

adding a synchronization pattern to digital data in each said channel at a proper timing at a transmit side;

transmitting said synchronization pattern and said digital data as serial data after parallel-to-serial conversion;

converting, at a receive side, said serial data to parallel data by serial-to-parallel conversion;

extracting from each said channel a received pattern equal in length to said synchronization pattern at a common proper timing at a receive side;

determining for each said channel said received pattern as being matched with said synchronization pattern if the degree of dissimilarity between received pattern and said synchronization pattern as a result of comparison therebetween is less than a first threshold value, and;

signalling detection of said synchronization pattern when the number of channels determined to have their received patterns matched with said synchronization pattern is more than a second threshold value.

3. The method for transmitting and receiving data according to claim 2, comprising the further steps of:

generating a channel disposition signal for each channel; and discriminating channel dispositions.

4. A method for transmitting and receiving parallel digital data in a plurality of channels, said method comprising the steps of:

adding a predetermined synchronization pattern to digital data in each said channel at a proper timing;

extracting from each said channel a received pattern equal in length to said synchronization pattern at a common proper timing;

determining for each said channel said received pattern as being matched with said synchronization pattern if the degree of dissimilarity between said received pattern and said synchronization pattern as a result of comparison therebetween is less than a predetermined threshold value; and detecting transmission skews among individual channels through comparison of timings of detection of said synchronization pattern in each channel.

5. A method for transmitting and receiving parallel digital data in a plurality of channels, said method comprising the steps of:

dividing all the channels of said parallel digital data, at a transmit side, into a plurality of channel units;

adding a predetermined synchronization pattern to digital data in each said channel unit at a proper timing at the transmit side;

transmitting a plurality of serial digital data for each channel unit after parallel-to-serial conversion of said parallel digital data;

extracting from each of the serial digital data a received pattern equal in length to said synchronization pattern at a common proper timing;

determining for each said channel unit said received pattern as being matched with said synchronization pattern if the degree of dissimilarity between said received pattern and said synchronization pattern as a result of comparison therebetween is less than a threshold value; and detecting transmission skews among said serial digital data through comparison of timings of detection of said synchronization pattern in each serial digital data; and restoring the original parallel digital data through compensation of said transmission skews and serial-to-parallel conversion of individual serial digital data.

6. An apparatus for receiving transmitted digital data in a plurality of channels comprising:

a plurality of detecting means for detecting, at common proper timing intervals, substantial similarity between a group of transmitted data and a synchronization pattern and outputting a detection signal when substantial similarity exists between said group of transmitted data and said synchronization pattern, each of said detecting means comprising:

a storage means for storing said group of transmitted data, and a comparison means for comparing a predetermined characteristic of said transmitted data and said synchronization pattern; and a controlling means for producing a sync signal when all said detecting means output said detection signal during said common timing intervals.

7. An apparatus for receiving transmitted digital data in a plurality of channels comprising:

a converting means for converting serially transmitted data into parallel data;

a plurality of detecting means responsive to said parallel data for detecting, at common proper timing intervals, substantial similarity between a group of transmitted data and a synchronization pattern and outputting a detection signal when substantial similarity exists between said group of transmitted data and said synchronization pattern, each of said detecting means further comprising:

a storage means for storing said group of transmitted data, and a comparison means for comparing a predetermined characteristic of said transmitted data and said synchronization pattern; and a controlling means for producing a sync signal when all said detecting means output said detection signal during said common timing intervals.

8. An apparatus for receiving transmitted digital data in a plurality of channels comprising:

a converting means for converting serially transmitted data into parallel data;

a plurality of detecting means responsive to said parallel data for detecting, at common proper timing intervals, substantial similarity between a group of transmitted data and a synchronization pattern and outputting a detection signal, each of said detecting means further comprising:

a storage means for storing said group of transmitted data, and a comparison means for comparing a predetermined characteristic of said transmitted data and said synchronization pattern; and a controlling means for producing a sync signal when all said detecting means output said detection signal, wherein said detecting means further produces channel disposition information based on said transmitted data, said apparatus further comprising:

a bit rotating means responding to said controlling means for effecting bit interchange according to channel disposition information provided by said detecting means.

* * * * *